METHOD OF MEASURING RADIATION
Filed Sept. 7, 1950
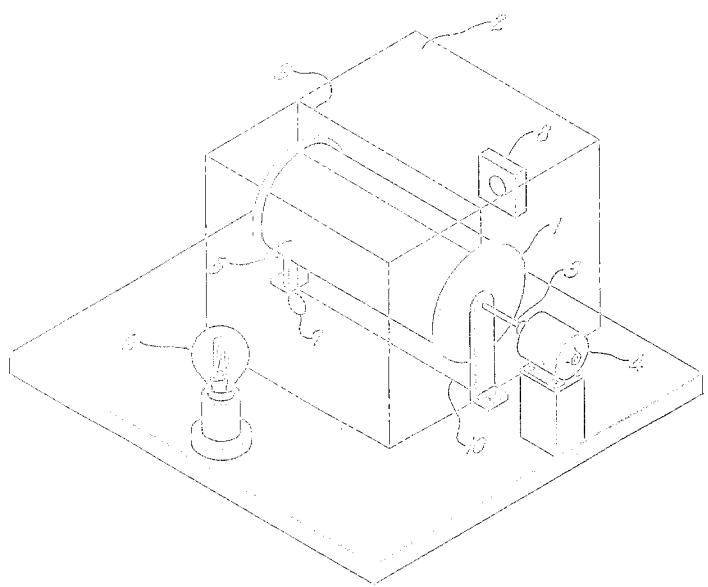
Inventor:
John D. Aicher,
by [signature]
His Attorney.

UNITED STATES PATENT OFFICE 2,388,092

METHOD OF MEASURING RADIATION

John C. Aicher, Cleveland Heights, Ohio, assignor to General Electric Company, a corporation of New York Application September 7, 1950, Serial No. 183,513

5 Claims. (Cl. 250—71)

This invention relates generally to the measurement of radiation and more particularly to a new and improved method of measuring a particular radiation which may be masked by other radiations of different wave lengths and greater intensity.

The common well-known methods of measuring the intensity of a radiation of a particular wave length consists of filtering out, either by means of a prism or by means of filters, undesired radiations of other wave lengths and measuring the desired one. Another method utilizes photoelectric cells responsive to certain selected ranges of wave lengths. However, these methods become very difficult of application at the shorter wave lengths, especially in the short ultraviolet region. This is due to the difficulty of obtaining filters or prisms which are effective at those wave lengths.

More specifically, it has been found to be very difficult to measure the intensity of radiation having a wave length of 1849 Å. The measurement of this wave length is of practical importance because the ozone-producing effects of certain lamps are caused by it. As an example of such a lamp, there might be mentioned the commercially available 4 watt mercury discharge lamp which is utilized for generating ozone in household-type refrigerators in order to destroy undesirable food odors.

The measurement of 1849 Å radiation has, until the present time, been quite difficult and required vacuum chamber instruments because of the absorption of this radiation in any appreciable length of path through air. Photocell methods have been very insensitive and have required high-sensitivity, unstable amplifiers. It has been suggested to use a calcium silicate phosphor activated with lead and manganese, the intention being to determine the intensity of slow decay phosphorescence produced by the 1849 Å radiation and not by the other longer wave lengths present. Unfortunately, the intensity of this slow decay phosphorescence is extremely low so that this method has not been found to be very successful.

An object of the present invention is to provide a new and improved method for measuring the intensity of radiation of a particular wave length which is present in combination with radiations of other wave lengths.

Another object of the invention is to provide a simple method of determining the intensity of radiation of a particular wave length which is masked by radiations of other wave lengths and of higher intensities.

The specific object of the invention is to provide a new and improved method of measuring 1849 Å radiation which is present in combination with visible radiation and 2537 Å radiation of greater intensity.

For further objects and advantages and for a better understanding of the invention, attention is now directed to the following description and accompanying drawing. Features of the invention believed to be novel will be more particularly pointed out in the appended claims.

The single figure of the drawing is a perspective view of a device commonly known as a phosphoroscope which has been adapted to carry out the method of my invention.

In its broadest aspects, my method of measurement involves the use of a phosphor which is responsive to the radiation which it is desired to measure and which has appreciable phosphorescence such that the radiation of light lasts for some time after the excitation has occurred. It will be understood that the term "fluorescence" is generally understood to refer to radiation which occurs during the excitation of a phosphor, whereas "phosphorescence" refers to the radiation occurring after the excitation has been removed, and these accepted meanings will be followed in the present application. In accordance with my invention, the radiation from the phosphor is not measured at the instant of excitation but rather is measured after the excitation has been removed. It will be understood that the invention is especially useful where in practice it would not be possible to measure the fluorescence occurring at the instant of excitation because the amount of visible light present would mask that which it is desired to measure. However, by measuring the phosphorescence remaining after the excitation and all visible light from extraneous sources are no longer present, the difficulty is obviated and very low intensities of the desired radiation may be measured thereby.

As a specific example of the application of my method to the measurement of 1849 Å radiation, a lead-free calcium silicate, manganese-activated phosphor may be utilized. This material fluoresces only slightly under 2537 Å and the blue part of the visible spectrum but fluoresces appreciably under 1849 Å radiation. It will be found that if it is attempted to measure the fluorescence due to the 1849 Å radiation from a lamp such as the 4-watt ozone-producing lamp mentioned above, the fluorescence is barely perceptible in the presence of the relatively large amount of visible light from the discharge in the lamp, and the direct measurement of the fluorescence radiation is very difficult and produces unsatisfactory results.

I have found, however, that the phosphorescence of the lead-free calcium silicate phosphor, after excitation by 1849 Å radiation, was quite bright and lasted for an appreciable time so that quantitative measurements could be made. The brightness of the phosphorescence varies with the intensity of the original irradiation of the phosphor by the 1849 Å radiation so that a measure of the phosphorescence provides, at the same time, a measure of the original radiation. The intensity of the phosphorescence, or after-glow, can be determined by means of a suitable cell in conjunction with a phosphoroscope. Such an instrument may take various forms; but, essentially, it comprises a surface, either a drum or a disc, coated with the phosphor and adapted to be continuously rotated past the exciting source and then into an area shielded from the exciting radiation and its inevitable accompanying light, the intensity of the phosphorescence being measured in this shielded area. The intensity of the phosphorescence may be determined either by utilizing a photocell and accompanying measurements or, more simply, by visual comparison with an adjustable brightness area having the same color as the phosphorescence.

Referring to the single figure of the drawing, there is shown a device for carrying out my method which comprises a rotatable drum 1 located within an enclosing box 2 which has been illustrated in dot-dash lines so the enclosed parts may be seen, it being understood that the box is made of opaque material and preferably painted with some radiation-absorbing substance. The sides of the drum are preferably in the form of circular discs of larger diameter than the drum itself in order to prevent the escape of light past the edges thereof. The drum is mounted on a shaft 3 which is adapted to be rotated by a motor 4, if desired, at a controllable speed. The cylindrical surface 5 of the drum is coated with the phosphor which it is desired to utilize, for instance, lead-free calcium silicate manganese-activated phosphor for measuring the 1849 Å radiation which has been discussed herein. The source of radiation 6 is mounted in front of an aperture or a window 7 which permits its radiation to illuminate a restricted area on one side of the drum. A photocell or other light-measuring device 8 is mounted on the opposite side of the drum, preferably diametrically opposite the window 7. Light baffles 9 and 10 fit closely around the drum and prevent any light from penetrating to the far side of the box wherein the light-measuring cell is mounted.

In operation, the light source 6, which may be a 4-watt mercury discharge ozone-producing lamp, illuminates the drum through the window 7. The drum is rotated and the excited phosphor is carried continuously past the baffles into the region wherein the photocell 8 is mounted. Since the visible radiation from the lamp 6 cannot penetrate to the far side of the box, the photocell responds only to the phosphorescence originally produced by the 1849 Å radiation. The cell thus provides a true measure of the intensity of 1849 Å radiation independently of the other long wave length radiations striking the drum on its near side opposite the window 7.

I have found that the speed of rotation of the drum is not critical and may be varied through wide limits without producing any appreciable change in the reading of the photocell. This appears to be due to the fact that, as the speed is increased, the decay in the phosphorescence is less; but, at the same time, the duration of excitation has been simultaneously decreased and the final situation remains practically unchanged. For the lead-free calcium silicate phosphor, the phosphorescence appears to be caused to the extent of approximately 92% by 1849 Å radiation, 4% by 2537 Å radiation, and the remainder, not exceeding 4%, by visible radiation. It will thus be seen that the device provides a wide measure of safety as a result of which a small variation in the amount of visible radiation will produce practically no effect upon the reading of the photocell.

The measuring device, that is, the photocell 8, may be calibrated to read the intensity directly, or comparative measurements may be made by stopping the window 7 and determining the effective window size for obtaining a predetermined reading with the radiation whose intensity is to be determined. The same results may be achieved by varying the spacing between the lamp and the aperture.

While I have described my new and improved method in connection with a lead-free calcium silicate phosphor for measuring the intensity of 1849 Å radiation, it will of course be understood that the method is equally applicable to use with other phosphors and to the measurement of other radiations. For instance, an antimony-free calcium halophosphate phosphor activated with manganese (and wherein the halogen is chlorine or fluorine or both) may be used for measuring 1849 Å radiation. Likewise, other phosphors may be used, with suitable variations in technique, for measuring other radiations, such as, for instance, zinc silicate activated with manganese, or calcium halophosphate (activated with antimony and manganese) for measuring 2537 Å radiation.

Likewise, by employing suitable filters, the phosphor designated as DR, and composed of calcium phosphate activated with both cerous cerium and manganese, may be used to measure erythemal (sun-tanning) radiation (about 2800–3200 Å). The appended claims are therefore intended to cover any such variations coming within the true spirit and scope of the invention.

What I claim as new and desire to secure by Letters Patent of the United States is:

1. The method of measuring the intensity of radiation of a particular wave length from a source in the presence of undesired radiations of other wave lengths, which comprises energizing the source at a constant level, moving a surface covered with a phosphor responsive in phosphorescence to said particular wave length and comparatively unresponsive therein to said other wave lengths past the source and into an area shielded from said radiations, and measuring the intensity of radiation from said phosphor in said shielded area.

2. The method of determining the intensity of a particular radiation from a lamp in the presence of other radiations of different wave lengths, which comprises energizing the lamp at a constant level, rotating a surface covered with a phosphorescent material responsive substantially exclusively to said particular radiation continuously past the lamp and then into an area shielded from the said radiations, and measuring the amount of light produced by said phosphor in said shielded area.

2. The method of measuring the intensity of 1849 Å radiation from a lamp in the presence of radiations of other wave lengths, which comprises energizing the lamp at a constant level, continuously rotating a surface covered with a lead-free calcium silicate manganese-activated phosphor past the lamp and into an area shielded from the exciting radiations, and measuring the intensity of the phosphorescence from said surface in said shielded area.

4. The method of obtaining a figure characteristic of radiation of a particular wave length from a lamp in the presence of undesired radiations of other wave lengths, which comprises energizing the lamp at a constant level, moving a surface covered with a phosphor responsive substantially exclusively to said particular radiation past the lamp and into an area shielded from said radiations, and determining the intensity of phosphorescence radiation from said phosphor in said shielded area to obtain said figure.

5. The method of obtaining a figure characteristic of a particular radiation from a lamp in the presence of other radiations of different wave lengths, which comprises energizing the lamp at a constant level, rotating a surface covered with a phosphor responsive in phosphorescence to said particular radiation and comparatively unresponsive therein to said other radiations continuously past the lamp and then into an area shielded from the exciting radiation, and measuring the amount of visible light produced by said phosphor in said shielded area to obtain said figure.

JOHN O. AICHER.

References Cited in the file of this patent
UNITED STATES PATENTS

| Number | Name | Date |
|---|---|---|
| 1,648,052 | Parker | Nov. 8, 1927 |
| 2,203,852 | Goldmark | June 4, 1940 |
| 2,319,392 | Zurian | May 25, 1943 |
| 2,501,530 | Blau | Mar. 21, 1950 |
| 2,521,959 | Tuttle | Sept. 12, 1950 |
| 2,539,193 | Marshall | Jan. 23, 1951 |